United States Patent
Bai et al.

(10) Patent No.: US 11,748,902 B2
(45) Date of Patent: *Sep. 5, 2023

(54) METHOD, DEVICE AND SYSTEM FOR GENERATING A CENTERLINE FOR AN OBJECT IN AN IMAGE

(71) Applicant: SHENZHEN KEYA MEDICAL TECHNOLOGY CORPORATION, Shenzhen (CN)

(72) Inventors: Junjie Bai, Seattle, WA (US); Zhihui Guo, Iowa City, IA (US); Youbing Yin, Kenmore, WA (US); Xin Wang, Seattle, WA (US); Yi Lu, Seattle, WA (US); Kunlin Cao, Kenmore, WA (US); Qi Song, Seattle, WA (US); Xiaoyang Xu, Shenzhen (CN); Bin Ouyang, Shenzhen (CN)

(73) Assignee: SHENZHEN KEYA MEDICAL TECHNOLOGY CORPORATION, Shenzhen (CN)

( * ) Notice: Subject to any disclaimer, the term of this patent is extended or adjusted under 35 U.S.C. 154(b) by 36 days.

This patent is subject to a terminal disclaimer.

(21) Appl. No.: 17/330,557

(22) Filed: May 26, 2021

(65) Prior Publication Data
US 2021/0279906 A1  Sep. 9, 2021

Related U.S. Application Data

(63) Continuation of application No. 16/550,093, filed on Aug. 23, 2019, now Pat. No. 11,069,078.

(Continued)

(51) Int. Cl.
*G06K 9/00* (2022.01)
*G06T 7/68* (2017.01)
(Continued)

(52) U.S. Cl.
CPC .............. *G06T 7/68* (2017.01); *G06N 3/045* (2023.01); *G06N 3/08* (2013.01);
(Continued)

(58) Field of Classification Search
CPC ............ G06T 7/68; G06T 2207/20084; G06T 2207/30101; G06T 2207/20081;
(Continued)

(56) References Cited

U.S. PATENT DOCUMENTS

| 11,069,078 B2* | 7/2021 | Bai ...................... G06N 3/0454 |
| 2007/0019846 A1* | 1/2007 | Bullitt .................. G06T 7/0014 |
| | | 382/128 |

(Continued)

FOREIGN PATENT DOCUMENTS

CN   107636659 A   1/2018

OTHER PUBLICATIONS

Vijay Badrinayarana, "SegNet: A Deep Convoution Encoder-Decoder Architecture for Image Segmentation" (Year: 2016).*

(Continued)

*Primary Examiner* — Dhaval V Patel
(74) *Attorney, Agent, or Firm* — Bayes PLLC

(57) ABSTRACT

Systems and methods for generating a centerline for an object in an image are provided. An exemplary method includes receiving an image containing the object. The method also includes detecting at least one bifurcation of the object using a trained bifurcation learning network based on (Continued)

the image. The method further includes extracting the centerline of the object based on a constraint condition that the centerline passes through the detected bifurcation.

20 Claims, 8 Drawing Sheets

Related U.S. Application Data

(60) Provisional application No. 62/722,145, filed on Aug. 23, 2018.

(51) Int. Cl.
*G06N 3/08* (2023.01)
*G06N 3/045* (2023.01)

(52) U.S. Cl.
CPC ............... *G06T 2207/20081* (2013.01); *G06T 2207/20084* (2013.01); *G06T 2207/30101* (2013.01); *G06T 2207/30172* (2013.01)

(58) Field of Classification Search
CPC . G06T 2207/30172; G06T 2207/20041; G06T 2207/10072; G06T 2207/10116; G06T 7/11; G06T 7/66; G06T 7/0012; G06T 2207/20021; G06T 2207/30004; G06N 3/0454; G06N 3/08; G06N 20/20
See application file for complete search history.

(56) References Cited

U.S. PATENT DOCUMENTS

| 2008/0132774 | A1 | 6/2008 | Milstein et al. |
| 2013/0216110 | A1* | 8/2013 | Zheng ................... G06T 7/0012 382/128 |
| 2016/0155234 | A1* | 6/2016 | Kang ........................ G06T 7/11 345/419 |
| 2017/0258433 | A1 | 9/2017 | Gulsun et al. |
| 2018/0033144 | A1 | 2/2018 | Risman et al. |

OTHER PUBLICATIONS

Dakai Jin et al., A Robust and Efficient Curve Skeletonization Algorithm for Tree-like Objects Using Minimum Cost Paths, Pattern Recognition Letters 76 (2016) 32-40.
First Office Action in corresponding Chinese Application No. 201910789475.6 dated Aug. 3, 2021 (7 pages).
Second Office Action in corresponding Chinese Application No. 201910789475.6 dated Mar. 2, 2022 (3 pages).
W. Zhang et al., "Image object recognition algorithm based on multi-scale block convolutional neural network," Computer Application, vol. 36, No. 4, Apr. 10, 2016.
Chen Sun et al., "ProNet: Learning to Propose Object-Specific Boxes for Cascaded Neural Networks," 2016 IEEE Conference on Computer2 Vision and Pattern Recognition (CVPR), Dec. 12, 2016.

* cited by examiner

METHOD, DEVICE AND SYSTEM FOR GENERATING A CENTERLINE FOR AN OBJECT IN AN IMAGE

CROSS-REFERENCE TO RELATED APPLICATIONS

This application is a continuation application of U.S. application Ser. No. 16/550,093, filed on Aug. 23, 2019, which claims the benefit of priority to U.S. Provisional Application No. 62/722,145, filed on Aug. 23, 2018, the entire contents of both of which are incorporated herein by reference.

TECHNICAL FIELD

The disclosure generally relates to medical image processing and analysis. More specifically, this disclosure relates to a method, a device, and a system for generating a centerline for an object, e.g., a vessel, in an image.

BACKGROUND

Centerline is a type of skeleton representation of an object, with each point equidistant to the object's boundary at a longitudinal position of the point. Centerline provides a concise representation that emphasizes geometrical and topological properties of the object, such as connectivity, length, direction, etc. especially for tree-like objects. It is widely used in optical character recognition, fingerprint recognition, medical image (2D, 3D, or 4D) analysis, etc. example, in optical character recognition task, correct extraction of the centerlines of characters is essential to construct a robust representation of characters in different fonts/sizes, etc. In medical image analysis of vessel tree structure, centerline extraction helps improving vessel segmentation and also enables the evaluation of vessel diameter at each longitudinal location and detection/quantification of stenosis, etc.

The current methods for extracting a centerline of an object, automatically or semi-automatically, may be divided into two major categories, morphological skeletonization and minimum cost path based methods. For morphological skeletonization methods such as erosion and thinning, small perturbations or noise on the image can easily lead to false positives of short centerlines (representing spurious branches). Although more global features may be adopted to reduce such false positives, however, even for moderately-sized images, usually hours of time are required which is clinically unacceptable. For the minimum cost path based methods, users are required to specify explicitly geometrical constraints, e.g., end points of unique branches and compute minimum cost paths. However, the current distance transform based cost image computation and end points detection cannot handle objects with uneven thickness at different locations robustly, resulting in either false positive centerlines in thick regions or lack of centerline for thin/small branches.

Further, traditional distance cost images are often scale-variant, which leads to inconsistent results between thick and thin regions. And traditional automated end point finding algorithms are often based on local maxima to detect protruding locations as end points. The end point detection usually struggles to balance between false positive detection and missing end points.

Besides, traditional methods also fail in "kissing" cases when two branches are partially close to each other, where the detected centerline for one branch can easily jump to the other branch. In order to alleviate all the above shortcomings, some traditional methods enforce a strong prior topological model such as a predefined number of branches with a predefined hierarchical structure. However, with such restrictions, the current methods are adapted only to very limited applications such as major airway center line extraction, which obstructs its promotion and development.

The present disclosure is provided to overcome the technical defects in the traditional method for extracting centerlines of object, with a variety of geometrical shapes and structures, in various images.

SUMMARY

In one aspect, a method for generating a centerline for an object is disclosed. The method includes receiving an image containing the object. The method also includes detecting at least one bifurcation of the object using a trained bifurcation learning network based on the image. Moreover, the method includes extracting the centerline of the object based on a constraint condition that the centerline passes through the detected bifurcation.

In another aspect, a system for generating a centerline for an object is disclosed. The system includes an interface configured to receive an image containing the object. The image is acquired by an imaging device. The system also includes a processor configured to detect at least one bifurcation of the object using a trained bifurcation learning network based on the image. In addition, the processor is configured to extract the centerline of the object based on a constraint condition that the centerline passes through the detected bifurcation.

In a further aspect, a device for generating a centerline for an object in an image is disclosed. The device includes a detection unit and an extraction unit. The detection unit is configured to detect at least one bifurcation of the object, using a trained bifurcation learning network based on the image. The extraction unit is configured to extract the centerline of the object based on a constraint condition that the centerline passes through the detected bifurcation.

In yet another aspect, a non-transitory computer readable medium storing instructions is disclosed. The instructions, when executed by a processor, perform a method for generating a centerline for an object. The method includes receiving an image containing the object. The method also includes detecting at least one bifurcation of the object using a trained bifurcation learning network based on the image. Moreover, the method includes extracting the centerline of the object based on a constraint condition that the centerline passes through the detected bifurcation.

The method, device, system, and medium for generating a centerline for an object in an image have a better performance confronting complex situations such "kissing" branches, crossing branches, etc., and increase the detection rate and lower the false positive rate of the end points (and also the object) due to the much bigger model capacity and ability of the learning network to learn from large amount of training data.

It is to be understood that the foregoing general description and the following detailed description are exemplary and explanatory only, and are not restrictive of the invention, as claimed.

BRIEF DESCRIPTION OF THE DRAWINGS

In the drawings, which are not necessarily drawn to scale, like reference numerals may describe similar components in different views. Like reference numerals having letter suffixes or different letter suffixes may represent different instances of similar components. The drawings illustrate generally, by way of example, but not by way of limitation, various embodiments, and together with the description and claims, serve to explain the disclosed embodiments. Such embodiments are demonstrative and not intended to be exhaustive or exclusive embodiments of the present method, device, system, or non-transitory computer readable medium having instructions thereon for implementing the method.

DETAILED DESCRIPTION

Hereinafter, the technical term "object" is used as compared to the background of the image. For medical images, "object" may refer to organs and tissues of interest, e.g., vessel, airway, glands. For optical character recognition, "object" may refer to characters. In some embodiments, medical image is used as an example of image and vessel is used as an example of the "object", but the method, device, and system in the embodiments may be easily and smoothly transformed to extraction of centerlines for other objects in other types of images. And the technical term "image" may refers to a complete image or an image patch cropped from the image.

Figure 1:
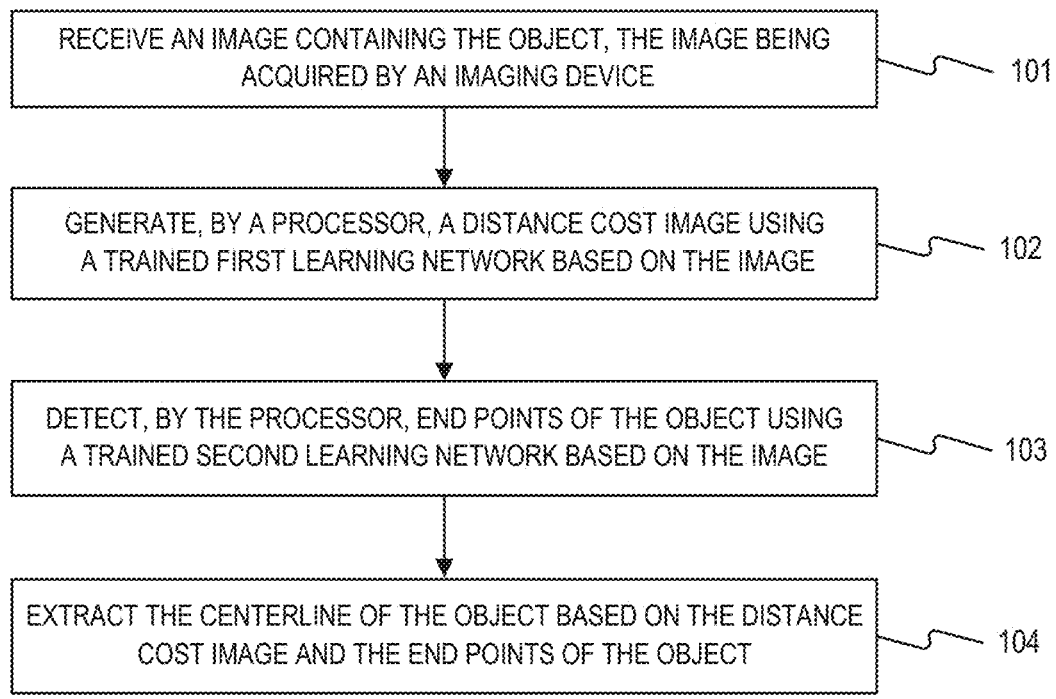
FIG. 1 illustrates a method for generating a centerline for an object in an image according to an embodiment of present disclosure.

FIG. 1 illustrates a computer-implemented method for generating a centerline for an object in an image according to an embodiment of present disclosure. As shown in FIG. 1, the centerline generation process 100 begins with receiving an image containing the object acquired by an imaging device (step 101). The image may be a 2D image, 3D image, or a 4D image. The image may be acquired directly by a various of imaging modalities, such as but not limited to CT, digital subtraction angiography (DSA), Mill, functional MRI, dynamic contrast enhanced MRI diffusion MRI, spiral CT, cone beam computed tomography (CBCT), positron emission tomography (PET), single-photon emission computed tomography (SPECT), X-ray imaging, optical tomography, fluorescence imaging, ultrasound imaging, radiotherapy portal imaging, or acquired by reconstruction based on the original images acquired by the image device. For example, a 3D vessel volume image may be obtained by reconstruction based on vessel DSA images at two different projection directions. The technical term "acquire" means any manner of obtaining, directly or indirectly, with or without additional image processing (noise reduction, cropping, reconstruction, etc.), and the acquired image is received as input image for the centerline generation process 100.

Based on the input image (2D, 3D, or 4D image), a distance cost image may be automatically generated by a processor using a trained first learning network (step 102). The technical term "distance cost image" means an image with the same dimension as that of the input image and each pixel thereon has an intensity indicating its distance from the centerline. By means of the trained first learning network, the generation of the distance cost image is robust to complex situations such as "kissing" branches, due to the capacity and ability of the first learning network to learn from large amount of data covering complex situations. Besides, the first learning network may adopt convolutional network, which has an efficient hierarchical learning capability, and may have a better performance confronting complex situations such as "kissing" branches, crossing branches, etc.

In some embodiments, the ground truth distance cost image, which is used for training the first learning network, may be normalized so that the intensity of each of its pixels indicates a normalized distance of the pixel from the centerline of the object. The normalized distance of the pixel belonging to the object may be a ratio of its distance from the centerline to the radius of the object at a longitudinal position of centerline corresponding to the pixel. In this manner, the intensity of each pixel belonging to the object may be 1 or less: the intensity of the pixel locating on the boundary of the object may be 1; and the intensities of the pixels within the boundary may be less than 1. Besides, the intensities of the pixels away from the object in the ground truth distance cost image may be predefined at a certain value, such as but not limited to 1 or more. Through trained using the normalized ground truth distance cost image as training data, the first learning network may learn from the scale-invariant distance cost of the pixels throughout the image, and may be used to efficiently compute a scale-invariant distance cost image, which may be robust to and may handle the objects with uneven thickness/diameters.

At step 103, the end points of the object may be detected by using a trained second learning network based on the input image. Although FIG. 1 shows a sequence of step 102 and step 103, it does not intend to limit the performing sequence of the two steps. Instead, as along as step 102 and step 103 are performed after step 101 and before step 104, they may be performed in any sequence. By means of the trained second learning network, the detection rate may be significantly higher and the false positive rate may be significantly lower compared to the prior-art rule-based local maxima finding algorithm, due to the much bigger model capacity and ability of the second learning network to learn from large amount of training data.

Then, the centerline generation process 100 may proceed to step 104: the centerline of the objected may be extracted based on the distance cost image and the end points of the object as input. In some embodiments, for any two end points, a path connecting them with minimal distance cost (i.e., the sum of the distance cost along the path) may be generated and the generated paths may be screened manually, semi-automatically, or automatically to filter out the false path (which is inconsistent with the topological structure of the object, e.g., its two ending points are not topologically connected with each other in anatomical structure of the object). The minimal cost path may be computed by various algorithms, such as but not limited to Dijkstra's algorithm, A* search algorithm, Bellman-Ford algorithm, and fast marching algorithm. Particularly, a path cost threshold may be preset and the path with a cost higher than the path cost threshold may be regarded as false path and cancelled.

In some embodiments, the detected end points may be screened and paired firstly, so as to find the starting end points and its corresponding terminating end points in pairs. For each pair of a starting end point and its corresponding terminating end point, a path connecting them with minimal distance cost may be generated as a part of the centerline of the object. In this manner, the work load on false path generation (for the end points which are not in pairs anatomically) may be saved and the extraction accuracy of the centerline may be further improved. The pairing of the detected end points may be performed automatically, semi-automatically, or by manual intervention.

In some embodiments, the second learning network may adopt a convolutional network, especially a fully convolutional network, so as to accelerate its computation on a GPU. Correspondingly, the second learning network may be used to predict an end point map based on the input image, with intensity of each pixel of the end point map indicating whether the pixel is an end point. Besides whether the pixel is an end point, the intensity may deliver richer information, such as but not limited to whether the pixel is a starting end point, a terminating end point, or is not an ending point, with which end point it is in pairs (if the pixel is an ending point), etc. Such information may be used to determine the primary topological structure of the object, based on which the centerline extraction step (step 104) may be adapted (simplified) to improve the extraction accuracy, increase computation speed, and reduce (or even avoid) the manual intervention.

As an example, under a condition that a starting end point is in pairs with multiple terminal end points, which means that the centerline associated with them is tree-like shaped, a path with minimal distance cost connecting the starting end point and each terminal end point may be determined and the determined paths may be integrated as the centerline of the corresponding portion of the object defined by the starting end point and the multiple terminal end points. Particularly, the starting end point serves as a root point of the tree-like centerline and the every other terminal end points serves as a leaf of the tree-like centerline. The series of minimal cost paths may constitute the centerline of the object. In some embodiments, for the tree-like centerline, the paths with the same starting end points, if are too close to each other (e.g., their distance is less than a threshold) in some part, the paths may be fused in said part to avoid false branches resulted from calculation error.

As another example, under a condition that a starting end point is in pairs with only one terminal end point, which means that the centerline associated with them is tube-like shaped, a path with minimal distance cost connecting them may be determined as the centerline of the corresponding portion of the object defined by the starting end point and the one terminal end point.

The centerline generation process 100 may avoid the spurious false positive centerlines generated by traditional morphological methods. It does not depend on a predefined structure/topology of the target object, and may be applied widely to various objects with varying structures and topologies.

In some embodiments, the centerline of the objected extracted at step 104 may be a single pixel-wide line, which may deliver the geometrical and topological properties of the object with a high resolution and sensitivity.

Figure 2:
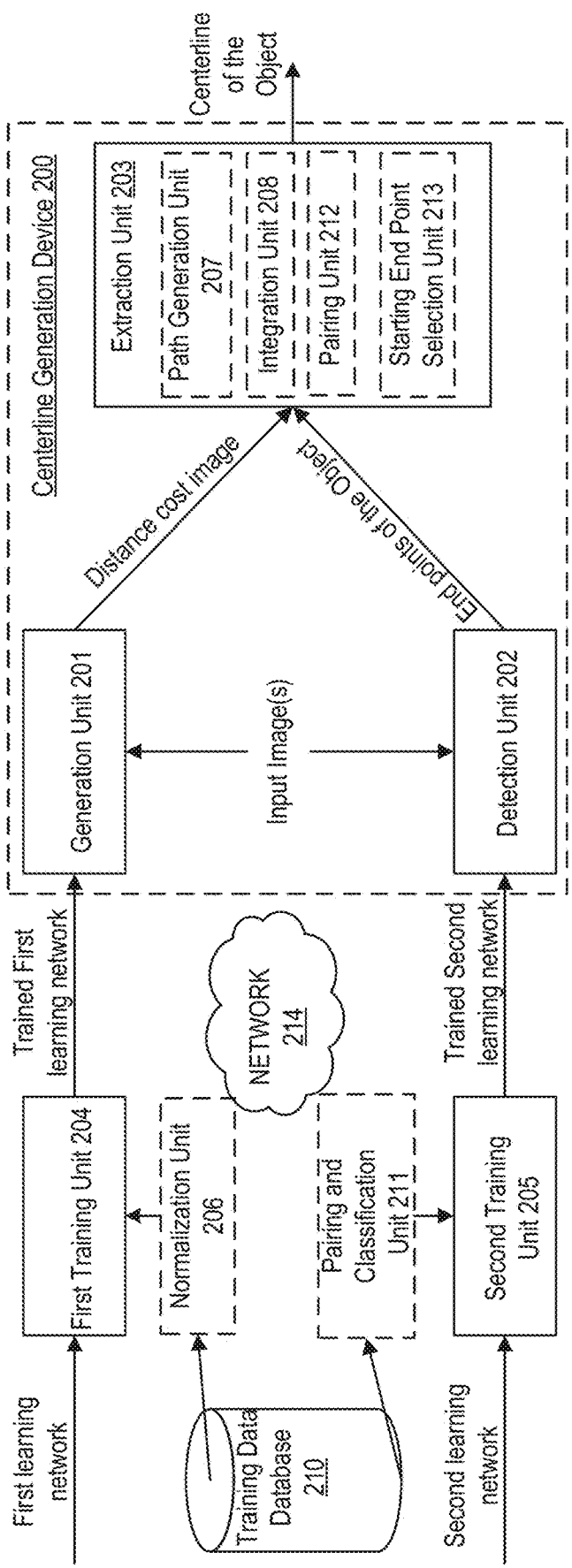
FIG. 2 illustrates a centerline generation device and its working process according to an embodiment of present disclosure.

FIG. 2 illustrates a centerline generation device 200 and its working process according to an embodiment of present disclosure. As shown in FIG. 2, centerline generation device 200 may include a generation unit 201, a detection unit 202, and an extraction unit 203. The trained first learning network may be transmitted from a first training unit 204 to the generation unit 201, and then the generation unit 201 may make use of the trained first learning network to generate a distance cost image based on the input image from the imaging device/medical image database 209. The trained second learning network may be transmitted from a second training unit 205 to the detection unit 202, and then the detection unit 202 may make use of the trained second learning network to detect the end points of the object based on the input image from the imaging device/medical image database 209. The distance cost image generated by the generation unit 201 together with the end points of the object detected by the detection unit 202 may be input into the extraction unit 203, which is configured to extract the centerline of the object based on the distance cost image with the end points of the object as constraint conditions.

In some embodiments, the extraction unit 203 may comprise a path generation unit 207 and an integration unit 208. The path generation unit 207 may be configured to generate a path connecting each pair of a starting end point and its corresponding terminating end point with minimal distance cost by means of any one of Dijkstra's algorithm, A* search algorithm, Bellman-Ford algorithm, and fast marching algorithm. And the integration unit 208 may be configured to integrate (e.g., add, fuse, etc.) all the generated paths as the centerline of the object.

In some embodiments, training process may be performed remote from the centerline generation device 200 (as shown in FIG. 2, neither of the first training unit 204 and the second training unit 205 is located within the centerline generation device 200) or performed locally at the centerline generation device 200.

As shown in FIG. 2, the first learning network and the training data (comprised by the medical image and its ground truth distance cost image, provided from the training data database 210) may be fed into the first training unit 204, so that the first training unit 204 may train the first learning network using the training data. In some embodiments, a normalization unit 206 may be added to perform a normalization on the ground truth distance cost image, so as to provide ground truth cost image that is scale-invariant. Accordingly, the first learning network may learn about it and generate distance cost image that is scale-invariant. The second learning network and the training data (comprised by the medical image and its ground truth list of end points, provided from the training data database 210) may be fed to the second training unit 205, so that the second training unit 205 may train the second learning network using the training data.

In some embodiments, a pairing and classification unit 211 may be added on the upstream of the second training unit 205, so as to post-process the end point labels in the medical image to provide ground truth end point map, with the intensity of its each pixel indicating whether the pixel is a starting end point or a terminating end point (classification) and with which end point it is in pairs (pairing). The classification may be performed by a variety of algorithms, such as but not limited to identify the end point with a larger diameter of the object at its position in the longitudinal direction of the object as starting end point. And the pairing may be performed by e.g., referring to the topological connection relationship between the end points. Particularly, if there is a connection portion of the object covering the two end points, then the two end points may be identified to be in pairs with each other. By means of the pairing and classification unit 211, the trained second learning network may predict directly an end point map, with the intensity of its each pixel indicating whether the pixel is a starting end point or a terminating end point and with which end point it is in pairs. As an alternative option, a pairing unit 212 and a starting end point selection unit 213 may be added into the extraction unit 203. The pairing unit 212 may be configured to pair the detected end points and the starting end point selection unit 213 may be configured to select a subset of the detected end points as starting end points. And the remained end points may be then identified as terminating end points. Correspondingly, the detection unit 202 may comprise a prediction unit (not shown), and the prediction unit may be configured to predict an end point map using the trained second learning network based on the image, with intensity of each pixel of the end point map indicating whether the pixel is an end point.

Figure 3:
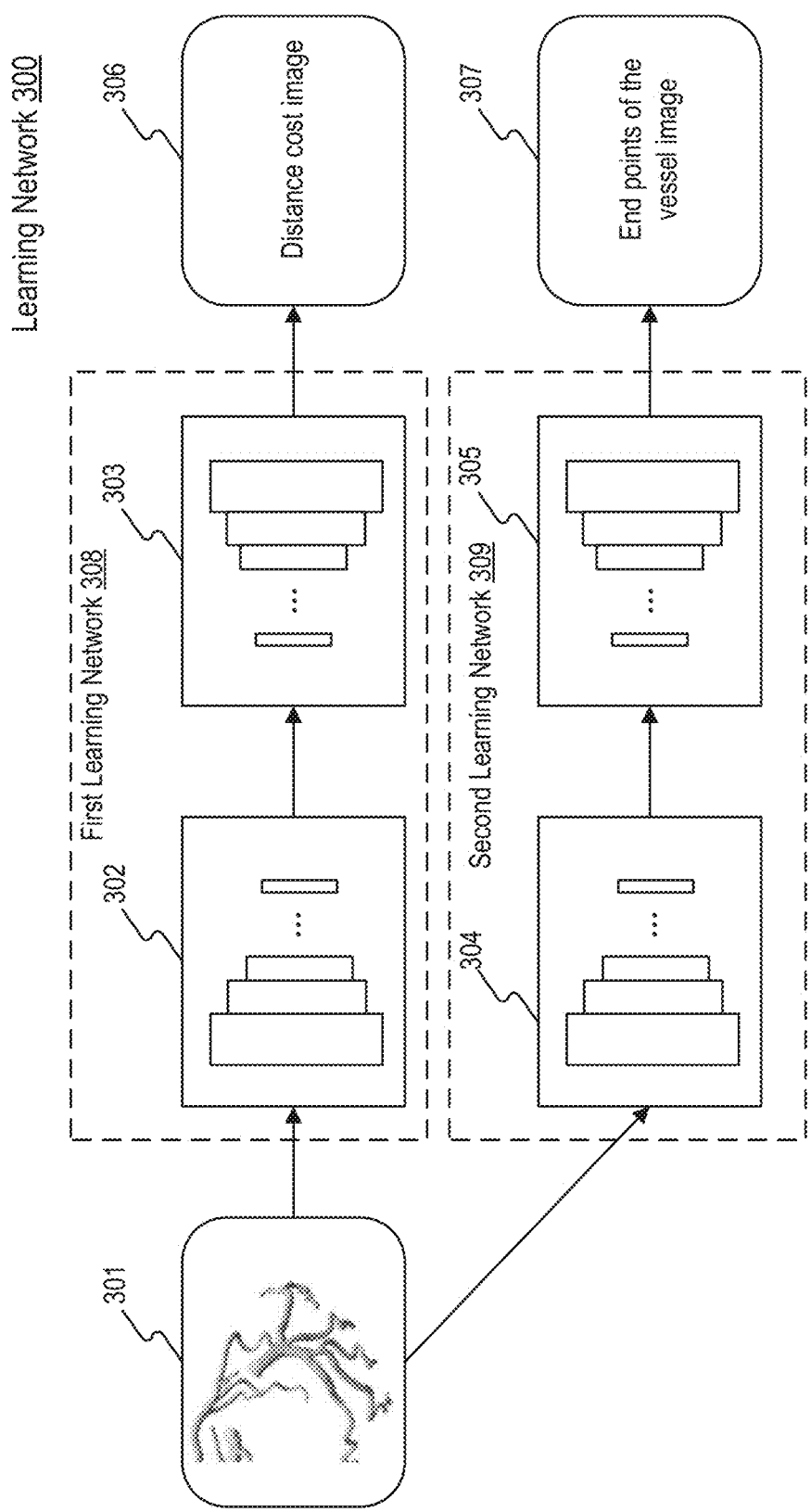
FIG. 3 illustrates an example of the learning network (including a first learning network and a second learning network) used in the method according to an embodiment of present disclosure.

The method according to an embodiment of present disclosure makes use of a learning network, comprising a first learning network and a second learning network. As shown in FIG. 3, the first learning network 308 may comprise an encoder 302 and a decoder 303, and the second learning network 309 may comprise an encoder 304 and a decoder 305. The encoders 302, 304 may be configured to extract features from the input image 301, the decoder 303 may be configured to generate the distance cost image 306 based on the features extracted by the encoder 302, and the decoder 305 may be configured to detect the end points 307 of the vessel based on the features extracted by the encoder 304. In some embodiments, each of the first learning network 308 and the second learning network 309 may be constructed based on convolutional network, which may consist of hierarchical combinations of convolutional layer, pooling layer, and up-sampling layer, etc. For example, the convolutional network may be implemented by any one of VGG, ResNet, DenseNet convolutional networks, etc.

As shown in FIG. 3, the first learning network 308 and the second learning network 309 are independent from each other, and thus may be trained independently from each other.

Figure 4:
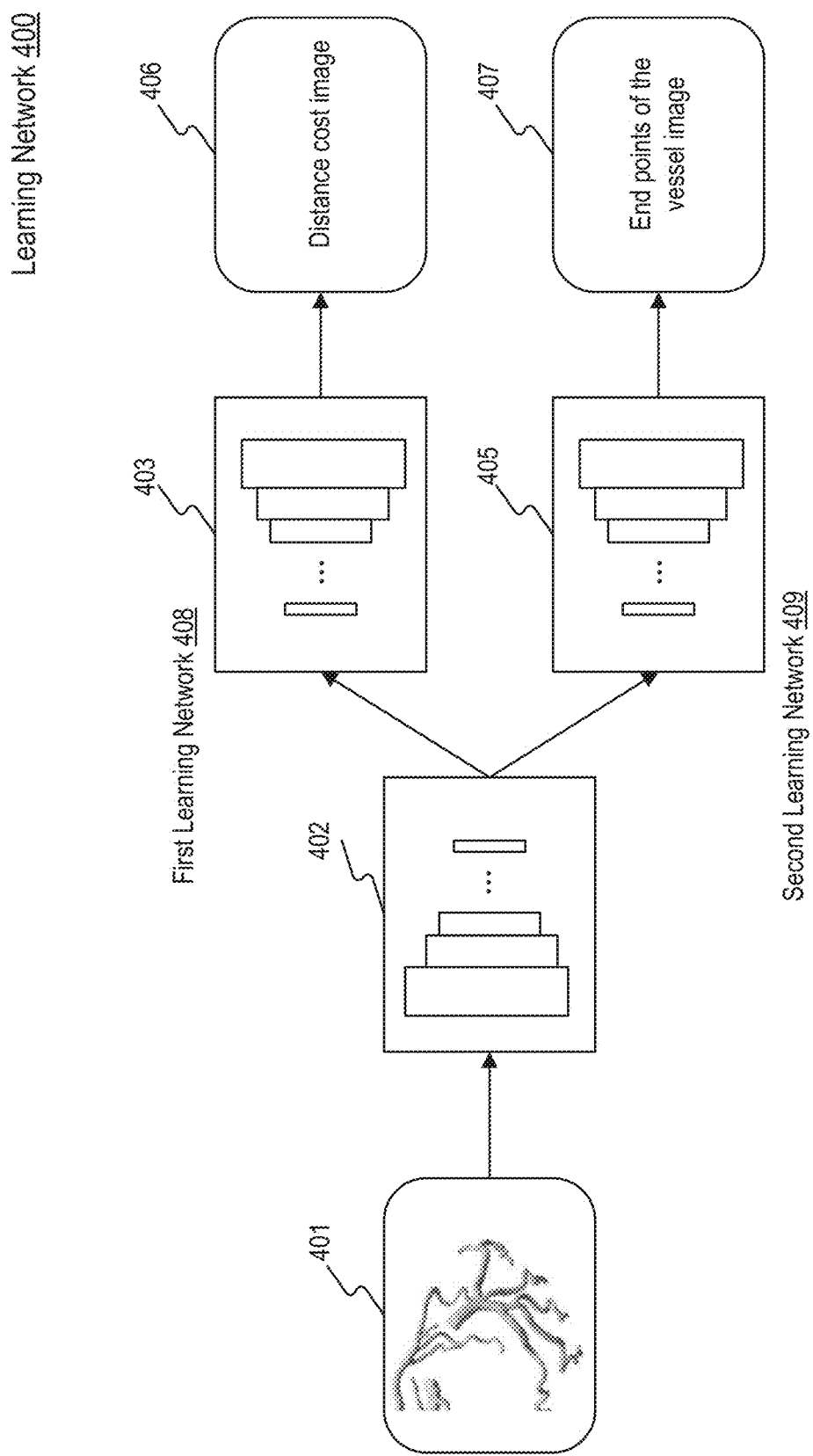
FIG. 4 illustrates an example of the learning network (including the first learning network and the second learning network) used in the method according to an embodiment of present disclosure.

FIG. 4 illustrates another example of the learning network used in the method according to an embodiment of present disclosure. The learning network 400 differs from the learning network 300 only in that the first learning network 408 shares an encoder 402 with the second learning network 409. The decoders 403, 405, the input image 401 the distance cost image 406, and the end points 407 of the vessel are each similar to the decoders 303, 305, the input image 301, the distance cost image 306, and the end points 307 of the vessel in FIG. 3, and thus their configurations are omitted here. The construction of the learning network as shown in FIG. 4 is significantly simplified compared that as shown in FIG. 3, much less parameters of the learning network need to be determined, and thus both the training of and the prediction using the learning network as shown in FIG. 4 may be easier and accelerated.

In some embodiments, the first learning network and the second learning network as shown in FIG. 3 may be trained separately or in an integrated manner. As shown in 5, the training process 500 may start at step 501 of loading a piece (or batch) of a first training data for the first learning network and a second training data for the second learning network. The first training data may be comprised of the input vessel image and the corresponding ground truth distance cost image, and the second training data may be comprised of the input vessel image and the corresponding ground truth end point map.

At step 502, a first loss function may be calculated based on the first training data using the current parameters of the first learning network, and a second loss function may be calculated based on the second training data using the current parameters of the second learning network. The first loss function and the second loss function may be integrated (e.g., but not limited to weighted mean squared error and/or cross entropy, etc.) at step 503.

At step 504, the parameters of the first and second learning network may be adjusted based on the integrated loss function. Then it may determine whether there is still other piece (batch) of training data (step 505), if so, the process 500 may proceed back to step 501, otherwise the process 500 ends. By means of the integrated loss function, the trained first and second learning network, as a whole, may provide nice performance on both distance cost image and end point map predictions, which serve as the base for the subsequent minimum cost path generation.

In some embodiments, the training process 500 may be slightly adjust to be applied to the learning network as shown in FIG. 4, wherein the first learning network shares the encoder with the second learning network. As an example, at step 504, parameters of two decoders (of the first and second learning network) and that of only one encoder (i.e., the common encoder of the first and second learning network) need to be adjusted based on the integrated loss function, and thus the training process may be simplified and accelerated.

Figure 5:
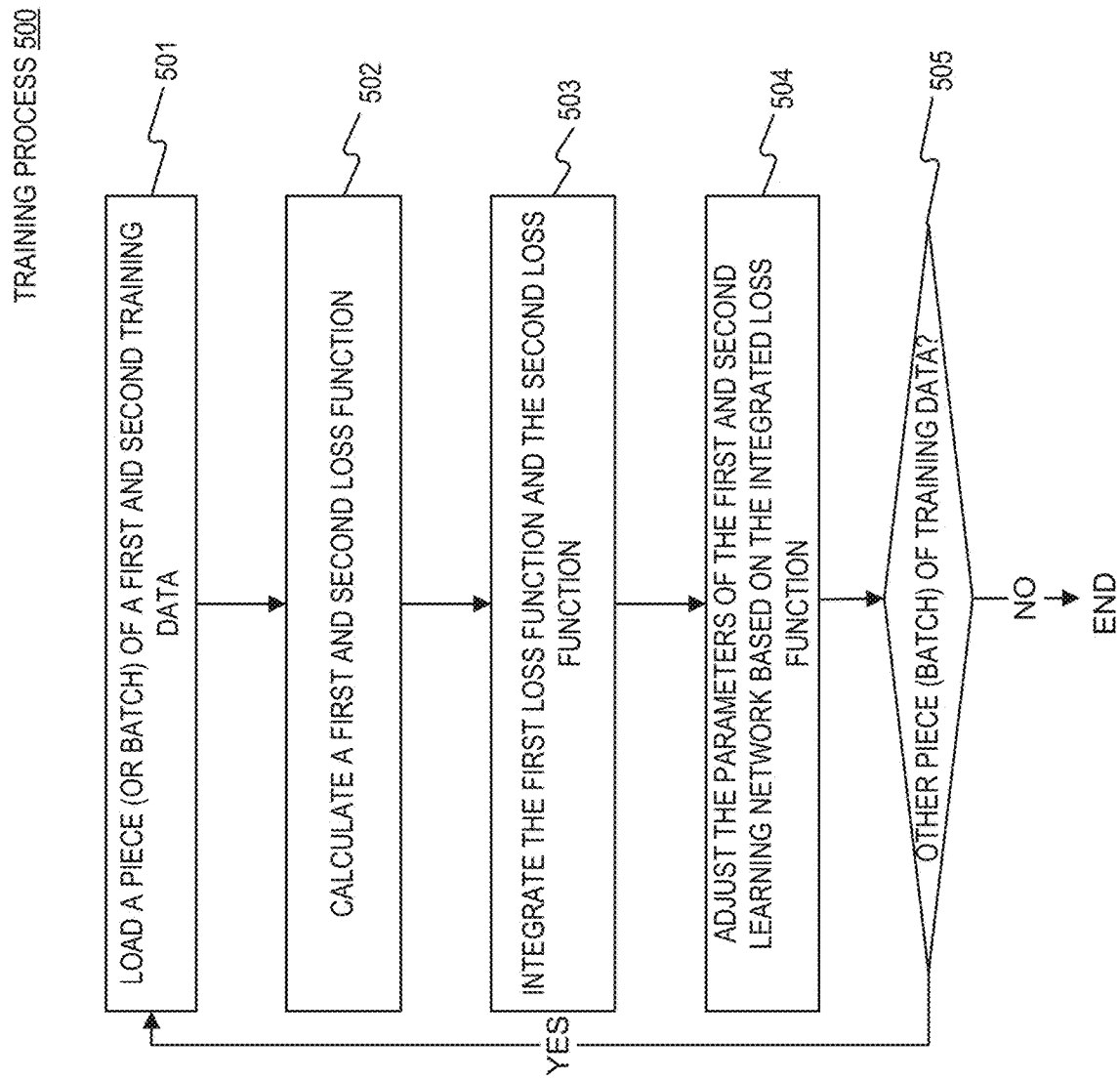
FIG. 5 illustrates a training process of the learning network (including the first learning network and the second learning network) according to an embodiment of present disclosure.
Figure 6:
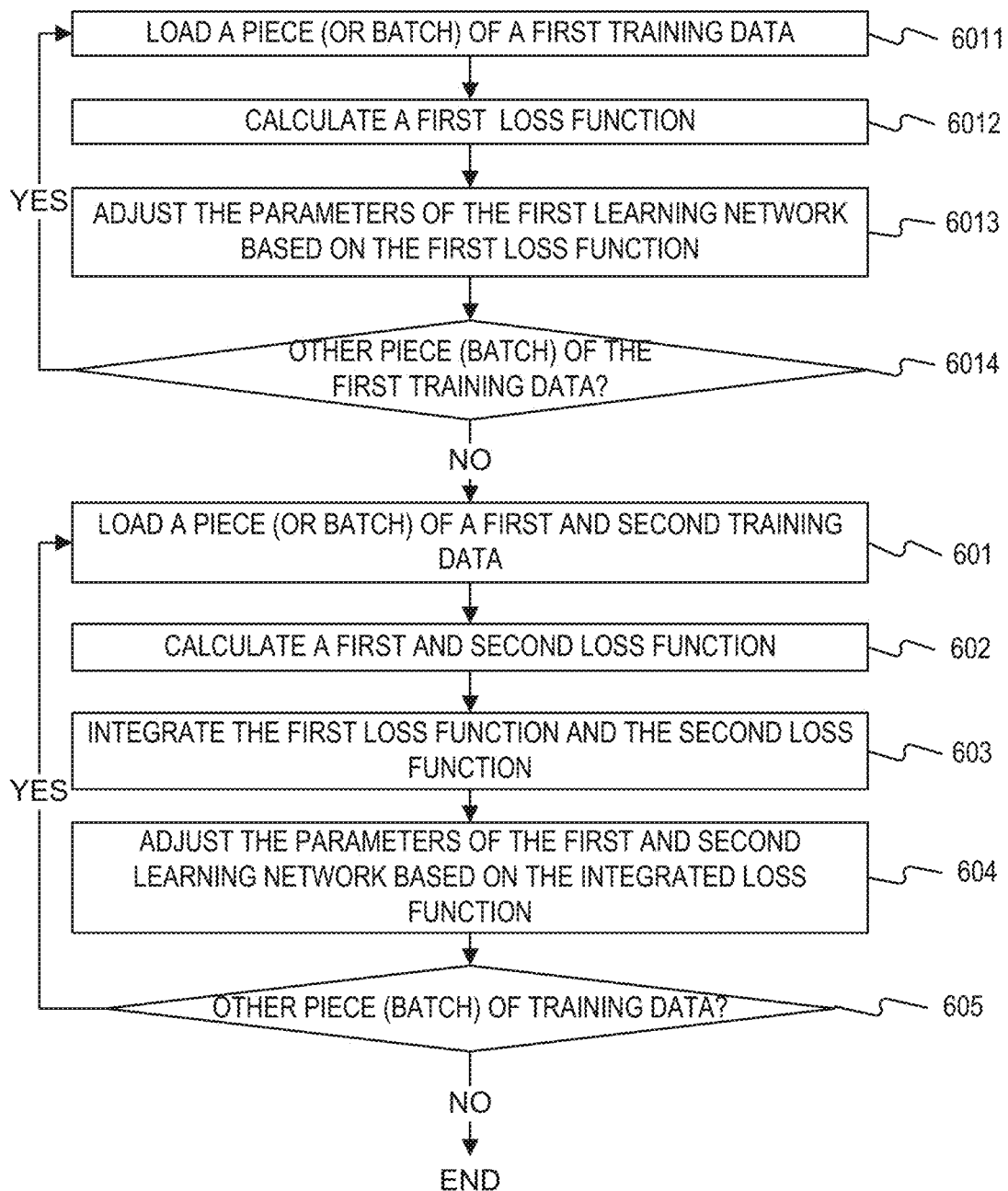
FIG. 6 illustrates a training process of the learning network (including the first learning network and the second learning network) according to an embodiment of present disclosure.

FIG. 6 illustrates a training process 600 of the learning network as shown in FIG. 6 according to an embodiment of present disclosure, wherein the steps 601-605 are similar to steps 501-505. Compared with the training process 500 as shown in FIG. 5, a pre-training of the first learning network (steps 6011-6014) is added preceding the step 601. At step 6011, a piece of the first training data may be loaded. The first loss function may be determined based on the first training data at step 6012, and then the parameters of the first learning network may be adjusted based on the first loss function at step 6013. Then it may determine whether there is still other piece of the first training data for pre-training of the first learning network (step 6014), if so, the process 600 may proceed back to step 6011, otherwise the process 600 may proceed to the step 601 to perform the integrated training of the first and second learning network. Since the ground truth distance cost images are easier to obtain and the intensity profile of the pixels of the ground truth distance cost image is relatively dense (compared to the intensity profile of the pixels of the ground truth, wherein a minority of intensities are non-zero since the sparse distribution of the end points in the vessel image), the training of the first learning network may be much easier and quicker. In this manner, the parameters of the encoder of the pre-trained first learning network may be used as initial parameters of the common encoder to perform the parameter adjusting step 604. It turns out that the integrated training of the first and second learning network using the parameters of pre-trained encoder as initial parameters of the common encoder may be significantly accelerated compared to that using arbitrary predefined initial parameters.

In some embodiments, not all the pieces of the first training data need to be adopted for the pre-training of the first learning network. Instead, a subset thereof may be adopted for the pre-training of the first learning network, so that the whole training process 600 may be further accelerated.

In some embodiments, the ground truth end point map for training the second learning network may be obtained by setting the intensities of the pixels in an area around each end point based on the intensity of the pixel at the end point. As example, intensities of 5-10 pixels around each end point may be set to non-zero values. In this manner, the positive samples in the ground truth end point map may be significantly increased, so as to alleviate the unbalance between the positive and negative samples (due to the sparse distribution of the end points in the vessel) and thus the training of the second learning network may become much easier.

Figure 7:
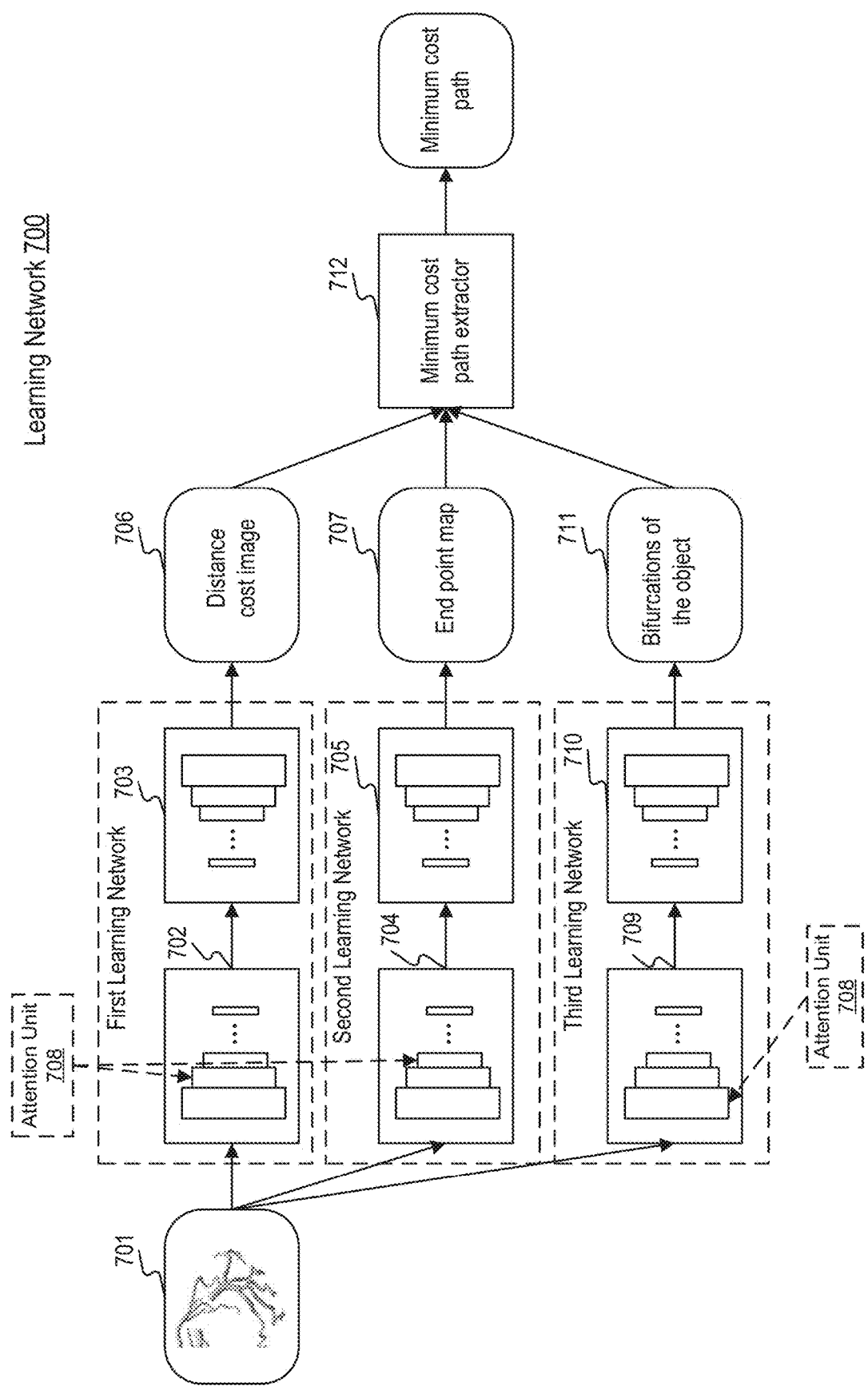
FIG. 7 illustrates an example of the learning network used in the method according to an embodiment of present disclosure.

Modified example of the learning network according to any embodiment of present disclose may be also adopted. As shown in FIG. 7, the learning network 700 may comprise the first learning network, the second learning network, and a third learning network. The first learning network may comprise: an encoder 702, which is configured to extract features from the input image; a decoder 703, which is configured to generate a distance cost image 706 based on the extracted features. The second learning network may comprise: an encoder 704, which is configured to extract features from the input image; a decoder 705, which is configured to generate an end point map 707 based on the extracted features. And the third learning network may comprise: an encoder 709, which is configured to extract features from the input image; a decoder 710, which is configured to detect the bifurcations of the object 711 based on the extracted features. Then the distance cost image 706, the end point map 707, and the bifurcations 711 may be fed together into a minimum cost path extractor 712, so that the minimum cost path extractor 712 may extract the minimum cost path connecting the end points as the centerline of the object based on the distance cost image 706 and the end point map 707 under a constraint condition that the centerline pass through the detected bifurcations 711. In this manner, the false branches of centerline may be efficiently avoided. In some embodiments, the first, second, and the third learning network may be constructed by convolutional network.

In some embodiments, one or more attention unit 708 may be added to any one of the encoders 702, 704, and 709 at location(s) therein so as to increase weights of the features extracted at the location corresponding to the object compared to that of the features not corresponding to the object. In this manner, the respective learning network may focus more precisely to regions of interest (e.g., the regions at the location corresponding to the object).

Figure 8:
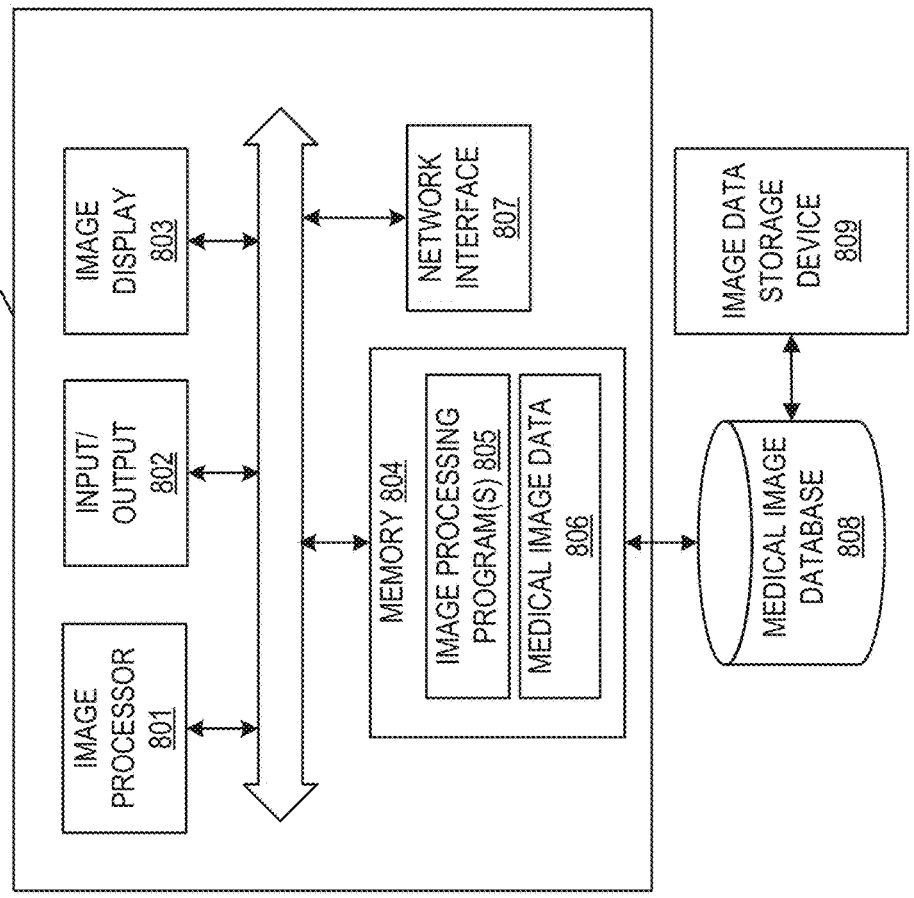
FIG. 8 depicts a block diagram illustrating an exemplary centerline generation device, according to an embodiment of present disclosure.

FIG. 8 illustrates a block diagram of an exemplary centerline generation system 800 according to an embodiment of present disclosure. The centerline generation system 800 may include a network interface 807, by means of which the centerline generation system 800 (or the centerline generation device therein, which refers to the other components than the network interface 807) may be connected to the network (not shown), such as but not limited to the local area network in the hospital or the Internet. The network can connect the centerline generation system 800 with external devices such as an image acquisition device (not shown), medical image database 808, and an image data storage device 809. An image acquisition device may use any type of imaging modalities, such as but not limited to CT, digital subtraction angiography (DSA), MRI, functional MRI, dynamic contrast enhanced—MRI, diffusion MRI, spiral CT, cone beam computed tomography (CBCT), positron emission tomography (PET), single-photon emission computed tomography (SPECT), X-ray, optical tomography, fluorescence imaging, ultrasound imaging, radiotherapy portal imaging.

In some embodiments, the centerline generation system 800 may be a dedicated intelligent device or a general-purpose intelligent device. For example, the system 800 may adopt a computer customized for image data acquisition and image data processing tasks, or a server placed in the cloud. For example, the system 800 may be integrated into the image acquisition device.

The centerline generation system 800 may include an image processor 801 and a memory 804, and may additionally include at least one of an input/output 802 and an image display 803.

The image processor 801 may be a processing device that includes one or more general processing devices, such as a microprocessor, a central processing unit (CPU), a graphics processing unit ((IPU), and the like. More specifically, the image processor 801 may be a complex instruction set computing (CIBC) microprocessor, a reduced instruction set computing (RISC) microprocessor, a very long instruction word (VLIW) microprocessor, a processor running other instruction sets, or a processor that runs a combination of instruction sets. The image processor 801 may also be one or more dedicated processing devices such as application specific integrated circuits (ASICs), field programmable gate arrays (FPGAs), digital signal processors (DSPs), system-on-chip (SoCs), and the like. As would be appreciated by those skilled in the art, in some embodiments, the image processor 801 may be a special-purpose processor, rather than a general-purpose processor. The image processor 801 may include one or more known processing devices, such as a microprocessor from the Pentium™, Core™, Xeon™, or Itanium® family manufactured by Intel™, the Turion™, Athlon™, Sempron™ Opteron™, FX™, Phenom™ family manufactured by AMD™, or any of various processors manufactured by Sun Microsystems. The image processor 801 may also include graphical processing units such as a GPU from the GeForce®; Quadro®, Testa® family manufactured by Nvidia™ GMA, Iris™ family manufactured by Intel™, or the Radeon™ family manufactured by AMD™. The image processor 801 may also include accelerated processing units such as the Desktop A-4 (6, 6) Series manufactured by AMD™, the Xeon Phi™ family manufactured by Intern™. The disclosed embodiments are not limited to any type of processor(s) or processor circuits otherwise configured to meet the computing demands of identifying, analyzing, maintaining, generating, and/or providing large amounts of imaging data or manipulating such imaging data to generate a distance cost image using a trained first learning network based on the input image, detect the end points of the object using a trained second learning network based on the input image, generate a minimum cost path connecting the end points, integrate the series of generated minimum cost paths, and/or train the learning network, or to manipulate any other type of data consistent with the disclosed embodiments. In addition, the term "processor" or "image processor" may include more than one processor, for example, a multi-core design or a plurality of processors each having a multi-core design. The image processor 801 can execute sequences of computer program instructions, stored in memory 804, to perform various operations, processes, methods disclosed herein.

The image processor 801 may be communicatively coupled to the memory 804 and configured to execute computer-executable instructions stored therein. The memory 804 may include a read only memory (ROM), a flash memory, random access memory (RAM), a dynamic random-access memory (DRAM) such as synchronous DRAM (SDRAM) or Rambus DRAM, a static memory (e.g., flash memory, static random access memory), etc., on which computer executable instructions are stored in any format. In some embodiments, the memory 804 may store computer-executable instructions of one or more image processing program(s) 805. The computer program instructions can be accessed by the image processor 801, read from the ROM, or any other suitable memory location, and loaded in the RAM for execution by the image processor 801. For example, memory 804 may store one or more software applications. Software applications stored in the memory 804 may include, for example, an operating system (not shown) for common computer systems as well as for soft-controlled devices.

Further, memory 804 may store an entire software application or only a part of a software application (e.g. the image processing program (s) 805) to be executable by the image processor 801. In addition, the memory 804 may store a plurality of software modules, for implementing the respective steps of the method for generating a centerline for an object in an image or the process for training the learning network consistent with the present disclosure. For example, the first training unit 204, the normalization unit 206, the generation unit 201, the second training unit 205, the pairing and classification unit 211, the detection unit 202, the extraction unit 203, the path generation unit 207, the integration unit 208, the pairing unit 212, and the starting end point selection unit 213 (as shown in FIG. 2), may be implemented as soft modules stored on the memory 804, especially as image process program(s) 805. For another example, at least the generation unit 201, the detection unit 202, and the extraction unit 203 are implemented as soft modules (e.g. the image processing program(s) 805) stored on the memory 804 the first training unit 204 and the second training unit 205, as well as the normalization unit 206 and the pairing and classification unit 211, may be located remote from the centerline generation system 800 and communicate with the generation unit 201/detection unit 202 to enable it receive the trained corresponding learning network, which is already trained by the first and second training unit 204, 205 with the training data from the training data database 210 (in an off-line training process) and/or the fresh training data (i.e., the distance cost image automatically generated and the end points automatically detected therefrom together with the corresponding input image) from the generation unit 201 and the detection unit 202 (in an on-line training process), so as to generate the centerline of the object in the input image.

Besides, the memory 804 may store data generated/buffered when a computer program is executed, for example, medical image data 806, including the medical images transmitted from image acquisition device(s), medical image database 808, image data storage device 809, etc. In some embodiments, medical image data 806 may include the image(s) received from the image acquisition devices to be treated by the image processing program(s) 805, and may include the medical image data generated during performing the method of generating the centerline of the object and/or training the learning network(s).

Besides, the image processor 801 may execute the image processing program(s) 805 to implement a method for generating centerline of the object, then associate the input image with the corresponding distance cost image automatically generated and the end points automatically detected, and transmit the same into the memory 804, especially as the medical image data 806 therein. In this manner, each on-line centerline generation process may generate a piece of fresh training data to update the medical image data 806. By means of executing the first and second training unit 204, 205 as shown in FIG. 2, the image processor 801 may train the first and second learning networks in an on-line manner to update the existing parameters (such as the weights) in the current learning network. In some embodiments, the updated parameters of the trained learning network may be stored in the medical image data 806, which may then be used in the next centerline generation for the same object of the same patient. Therefore, if the image processor 801 determines that the centerline generation system 800 has performed a centerline generation for the same object of the present patient, then the latest updated learning networks for centerline generation may be recalled and used directly.

In some embodiments, the image processor 801, upon performing an on-line centerline generation process, may associate the input image together with the automatically (or semi-automatically) generated centerline of the object as medical image data 806 for presenting and/or transmitting. In some embodiments, the input image together with the generated centerline may be displayed on the image display 803 for the user's review. In some embodiments, the medical image data by associating the input image with the generated centerlines (or the distance cost image and the end points) may be transmitted to the medical image database 808, so as to be accessed, obtained, and utilized by other medical devices, if needed.

In some embodiments, the image data storage device 809 may be provided to exchange image data with the medical image database 808, and the memory 804 may communicate with the medical image database 808 to obtain the images of the current patient. For example, the image data storage device 809 may reside in other medical image acquisition devices, e.g., a CT which performs scan on the patients. The slices of the patients on the object (such as vessel) may be transmitted, reconstructed into a volumetric image and saved into the medical image database 808, and the centerline generation system 800 may retrieve the volumetric image of the object from the medical image database 808 and generate centerline for the object in the volumetric image.

In some embodiments, the memory 804 may communicate with the medical image database 808 to transmit and save the input volumetric image associated with the generated distance cost image and the detected end points into the medical image database 808 as a piece of training data, which may be used for off-line training as described above.

For example, the image display 803 may be an LCD, a CRT, or an LED display.

The input/output 802 may be configured to allow the centerline generation system 800 to receive and/or send data. The input/output 802 may include one or more digital and/or analog communication devices that allow the system 800 to communicate with a user or other machine and device. For example, the input/output 802 may include a keyboard and a mouse that allow the user to provide an input.

In some embodiments, the image display 803 may present a user interface, so that the user, by means of the input/output 802 together with the user interface, may conveniently and intuitively correct (such as edit, move, modify, etc.) the automatically generated centerline of the object, the automatically generated distance cost image, and the automatically detected end points.

The network interface 807 may include a network adapter, a cable connector, a serial connector, a USB connector, a parallel connector, a high-speed data transmission adapter such as optical fiber, USB 6.0, lightning, a wireless network adapter such as a Wi-hi adapter, a telecommunication (6G, 4G/LTE, etc.) adapters. The system 800 may be connected to the network through the network interface 807. The network may provide the functionality of local area network (LAN), a wireless network, a cloud computing environment (e.g., software as a service, platform as a service, infrastructure as a service, etc.), a client-server, a wide area network (WAN), and the like.

Various operations or functions are described herein, which may be implemented as software code or instructions or defined as software code or instructions. Such content may be source code or differential code ("delta" or "patch" code) that can be executed directly ("object" or "executable" form). The software code or instructions may be stored in computer readable storage medium, and when executed, may cause a machine to perform the described functions or operations and include any mechanism for storing information in the form accessible by a machine (e.g., computing device, electronic system, etc.), such as recordable or non-recordable media (e.g., read-only memory (ROM) random access memory (RAM), disk storage media, optical storage media, flash memory devices, etc.).

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments.

Exemplary methods described herein can be machine or computer-implemented at least in part. Some examples can include a non-transitory computer-readable medium or machine-readable medium encoded with instructions operable to configure an electronic device to perform methods as described in the above examples. An implementation of such methods can include software code, such as microcode, assembly language code, a higher-level language code, or the like. The various programs or program modules can be created using a variety of software programming techniques. For example, program sections or program modules can be designed in or by means of Java, Python, C, C++, assembly language, or any known programming languages. One or more of such software sections or modules can be integrated into a computer system and/or computer-readable media. Such software code can include computer readable instructions for performing various methods. The software code may form portions of computer program products or computer program modules. Further, in an example, the software code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. Further, the steps of the disclosed methods can be modified in any manner, including by reordering steps or inserting or deleting steps. It is intended, therefore, that the descriptions be considered as examples only, with a true scope being indicated by the following claims and their full scope of equivalents.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A method for generating a centerline of an object, comprising:
   receiving an image containing the object, wherein the image is acquired by an imaging device;
   detecting, by a processor, at least one bifurcation of the object using a trained bifurcation learning network based on the image;
   detecting, by the processor, end points of the object; and
   extracting, by the processor, the centerline of the object based on the end points of the object and a constraint condition that the centerline passes through the detected bifurcation.

2. The method of claim 1, wherein the method further comprises generating, by the processor, a distance cost image using a trained distance cost learning network based on the image, wherein the extracting is performed further based on the distance cost image.

3. The method of claim 2, wherein an intensity of each pixel of the distance cost image is indicative of a distance of the pixel from the centerline of the object.

4. The method of claim 1, wherein the end points of the object are detected using a trained end point learning network based on the image.

5. The method of claim 4, wherein the detecting the end points of the object further comprises:
   predicting, by the processor, an end point map using the end point learning network based on the image, wherein an intensity of a pixel of the end point map is indicative of whether the pixel corresponds to a starting end point or a terminating end point, or the pixel does not correspond to an ending point.

6. The method of claim 4, wherein the extracting the centerline of the object comprises:
generating a path connecting a pair of end points with a minimal distance cost, wherein the path passes through the detected bifurcation.

7. The method of claim 1, wherein the bifurcation learning network is a convolutional network.

8. The method of claim 1, wherein the extracted centerline of the object comprises a single pixel-wide line.

9. The method of claim 1, wherein the bifurcation learning network comprises an encoder configured to extract features, and the encoder further comprises an attention unit applying larger weights on features extracted at a location corresponding to the object compared to weights on features extracted at another location not corresponding to the object.

10. The method of claim 1, wherein the bifurcation learning network comprises an encoder configured to extract features and a decoder configured to detect the bifurcations of the object based on the extracted features.

11. The method of claim 1, wherein the object comprises a vessel.

12. A system for generating a centerline of an object, comprising:
an interface configured to receive an image containing the object, wherein the image is acquired by an imaging device; and
a processor configured to:
detect at least one bifurcation of the object using a trained bifurcation learning network based on the image;
detect end points of the object; and
extract the centerline of the object based on the end points of the object and a constraint condition that the centerline passes through the detected bifurcation.

13. The system of claim 12, wherein the processor is further configured to generate a distance cost image using a trained distance cost learning network based on the image, wherein the extracting is performed further based on the distance cost image.

14. The system of claim 12, wherein the end points of the object are detected using a trained end point learning network based on the image.

15. The system of claim 14, wherein the processor is further configured to:
generate a path connecting a pair of a starting end point and a corresponding terminating end point with a minimal distance cost, wherein the path passes through the detected bifurcation.

16. The system of claim 12, wherein the bifurcation learning network is a convolutional network.

17. The system of claim 12, wherein the extracted centerline of the object comprises a single pixel-wide line.

18. The system of claim 12, wherein the bifurcation learning network comprises an encoder configured to extract features, and the encoder further comprises an attention unit applying larger weights on features extracted at a location corresponding to the object compared to weights on features extracted at another location not corresponding to the object.

19. The system of claim 12, wherein the object comprises a vessel.

20. A non-transitory computer readable medium storing instructions that, when executed by a processor, perform a method for generating a centerline of an object, the method comprising:
receiving an image containing the object, wherein the image is acquired by an imaging device;
detecting at least one bifurcation of the object using a trained bifurcation learning network based on the image;
detecting end points of the object; and
extracting the centerline of the object based on the end points of the object and a constraint condition that the centerline passes through the detected bifurcation.

\* \* \* \* \*